United States Patent [19]

Richards et al.

[11] Patent Number: 5,511,577
[45] Date of Patent: Apr. 30, 1996

[54] AIR RELEASE VALVE

[75] Inventors: Kevin Richards, Kempton Park; Michael P. Muller, Benoni, both of South Africa

[73] Assignee: Mulric Hydro Projects (Proprietary) Limited, Boksburg North, South Africa

[21] Appl. No.: 269,968

[22] Filed: Jul. 1, 1994

[30] Foreign Application Priority Data

Mar. 2, 1994 [ZA] South Africa .......................... 94/1452

[51] Int. Cl.⁶ .................................................. F16K 31/18
[52] U.S. Cl. .......................................... 137/202; 137/411
[58] Field of Search ..................................... 137/202, 411

[56] References Cited

U.S. PATENT DOCUMENTS 2,853,092  9/1958  Klikunas ................................ 137/202

FOREIGN PATENT DOCUMENTS 59-113383  6/1984  Japan ..................................... 137/202
1571449    7/1980  United Kingdom .

OTHER PUBLICATIONS

Brochure "Adams Sewage Air Relief Valves," undated.
Brochure "Epex Air Relief Valves," undated.
Brochure "Anti-Slam, Regulated Closure Air & Vacuum Valves," Revised Aug. 1, 1989.
Brochures concerning prior APCO valves, undated.

Primary Examiner—Gerald A. Michalsky
Attorney, Agent, or Firm—Marshall & Melhorn

[57] ABSTRACT

The air release valve comprises a valve chamber (36) having an inlet (20) and an outlet (24). Inside the chamber is a control float (38) which is responsive to changes in liquid level in the chamber. There is also a a stack of valve members (40, 42, 44) in the chamber above the control float. The valve members have vent passages through them which increase in size with increasing height in the stack but which are smaller than the outlet (24). The top valve member (44) in the stack is designed to be lifted up, by differential air pressures acting on it, to seat on the outlet (24) and thereby reduce the effective size of the outlet when a pipeline served by the air release valve is filling with liquid and the liquid displaces air through the valve.

7 Claims, 3 Drawing Sheets

AIR RELEASE VALVE

BACKGROUND TO THE INVENTION

This invention relates to an air release valve.

Air release valves are installed in liquid reticulation pipelines and serve to vent to atmosphere gases entrained with the liquid conveyed in the pipeline. One known type of air release valve is described in the specification of South African patent 88/3478. In this case there is a closure member which seats on the valve outlet under pressure conditions and which is formed with a small bleed orifice that vents accumulated air under the control of a control float.

While the valve described in patent 88/3478 has been shown to work extremely well in practice, it suffers from a drawback that is experienced during filling of the pipeline. The situation is that the closure member is lifted dynamically to seat on the valve outlet as air rushes out of the valve. Air can then only vent slowly through the small orifice and the process of pipeline filling is slow.

SUMMARY OF THE INVENTION

One aspect of the present invention provides an air release valve comprising:

valve chamber having an inlet and an outlet, a control float in the chamber which is movable, in use, in response to changes in liquid level in the chamber, and a stack of movable valve members in the chamber above the control float, the movable valve members having vent passages therethrough which increase in size with increasing height in the stack but which are smaller than the outlet, and the top movable valve member in the stack being adapted to be lifted up, by differential air pressures acting on it, to seat on the outlet and thereby reduce the effective size of the outlet when a pipeline served by the air release valve is filling with liquid and the liquid displaces air through the valve.

There may be at least two valve members which are lifted by differential air pressures during filling, thereby to reduce the effective size of the outlet in increments. In addition to these valve members there may be a further valve member which is adapted to be lifted up, to seat against the valve member immediately above it, by the control float when the control float is buoyed up in the valve chamber by liquid which enters the valve chamber when air has been evacuated from the pipeline during pipeline filling.

In one embodiment of the invention, the upper end of the vent passage of each movable valve member is surrounded by an annular valve seat adapted to seal against the valve member immediately above it.

Preferably, there is a round cylindrical housing defining the valve chamber, the vent passages of the valve members being located on the axis of the housing.

Preferably also, the control float has a valve seat on the axis of the housing and against which the bottom valve member in the stack can seat.

A second aspect of the present invention provides a method of venting air from a pipeline during filling thereof with a liquid, the method comprising the steps of providing in the pipeline an air release valve having a valve chamber with an inlet and an outlet through which air can vent from the pipeline, and reducing the effective size of the outlet, thereby to control the rate at which air can escape from the pipeline and the rate at which liquid can fill the pipeline.

In this method, the effective size of the outlet may be reduced in a plurality of incremental steps.

DESCRIPTION OF PREFERRED EMBODIMENTS

Figure 1:
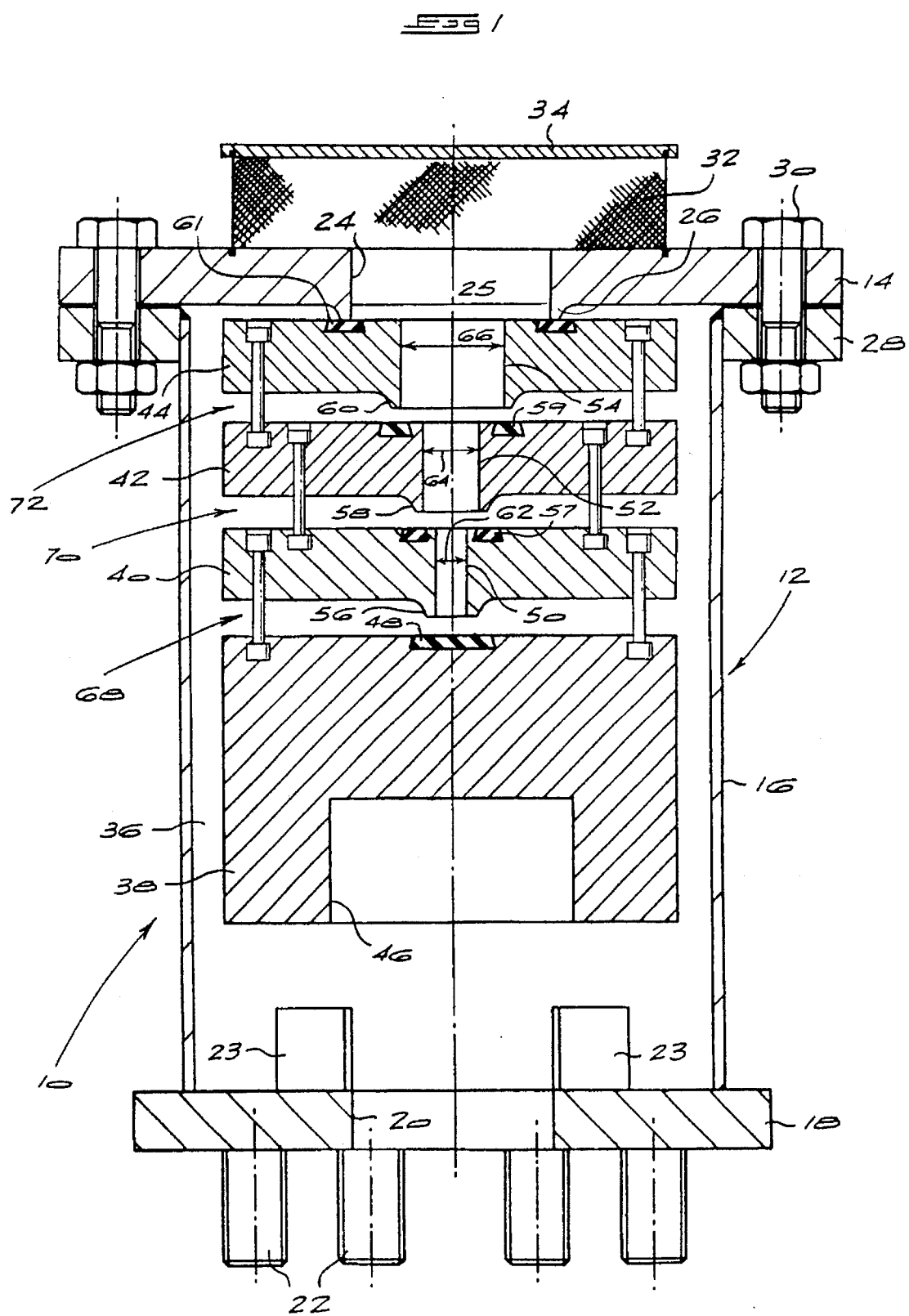
FIG. 1 shows a cross-sectional view of a first embodiment of the invention.

The air release valve 10 illustrated in FIG. 1 has a housing 12 defined by an upper flange 14, a round cylindrical wall 16 and a lower flange 18. The lower flange 18 is formed with a central inlet opening 20 and carries threaded studs 22 by means of which the valve is connected to a flanged standpipe or the like at a selected point in a pipeline. Angularly spaced, upstanding stops 23 are mounted on the upper surface of the lower flange as illustrated.

The upper flange 14 is formed with a central outlet opening 24 which has a diameter 25 and which is circumscribed by a downwardly depending lip 26. It is connected to an annular flange 28 extending from the wall 16 by means of bolts 30.

A round cylindrical mesh wall 32 extends between the upper flange 14 and a lid 34, and prevents dirt, flying insects and so forth from entering the valve housing through the outlet 24.

The housing 12 defines a valve chamber 36 which communicates with the interior of the pipeline via the inlet opening 20 and with atmosphere via the outlet opening 24. The chamber 36 accommodates a control float 38 and first, second and third movable valve members in the form of kinetic floats 40, 42 and 44 respectively. All the floats typically have a specific gravity of about 0,95.

The control float is formed with a central hollow 46 and carries an axially located valve seat 48 on its upper surface. The kinetic floats 40, 42 and 44 are formed with axial passages 50, 52 and 54 respectively. The lower ends of the passages 50, 52, and 54 are surrounded by downwardly depending lips 56, 58 and 60 respectively, and their upper ends are surrounded by annular seats 57, 59 and 61 respectively. The passages have diameters 62, 64 and 66 respectively and it will be noted that the diameter 62 is less than the diameter 64 and that the diameter 64 is less than the diameter 66.

The control float 38 is connected to the first kinetic float 40 by means of a connector arrangement 68 which allows some lost motion to take place between the floats 38 and 40 in the vertical sense. In similar fashion, the kinetic floats 40, 42 and 44 are interconnected by further connector arrangements 70 and 72 as illustrated.

Various modes of operation of the valve illustrated in FIG. 1 are described below in turn.

Pipeline Filling

At the outset, the control float 38 rests on the stops 23 and the kinetic floats rest one on top of the other on the control float. Air displaced from the pipeline by inflowing water enters the valve chamber 36 through the inlet 20 between the stops 23.

The air escapes from the valve chamber 36 to atmosphere through the outlet opening 24. It will be appreciated that large volumes of air can escape rapidly from the pipeline.

Pressure builds up in the valve chamber 36. As soon as a predetermined dynamic differential pressure is created across the kinetic float 44, this float is lifted up dynamically and the lip 26 seals against the seat 61. The diameter of the outlet through which escaping air must flow is thus reduced from the diameter 25 to the diameter 66. Because of the reduction in diameter, and hence area, available to air flow, the rate of air flow through the valve is reduced.

When the pressure has built up further to a sufficient value, the next kinetic float 42 is lifted up with the result that the lip 60 seals against the seat 59. The diameter available to flow by the escaping air is reduced from the diameter 66 to the diameter 64. The rate of air flow through the valve is thus reduced further.

Similarly, after a further pressure rise, the kinetic float 40 is lifted up and the lip 58 seals against the seat 57. The rate of air flow through the valve is reduced further.

The incremental reductions in air flow rate serve gradually to reduce the water flow rate as the pipeline fills. There is no sudden, large reduction in water flow rate when the valve finally closes as described below.

It is therefore anticipated that water hammer and other hydraulic shock effects will be reduced and that possible shock damage to the valve and/or pipeline can be avoided.

Air Venting During Normal Pressurised Operation

The valve finally closes when the air has been completely evacuated, water enters the chamber 36, the float 38 is buoyed up by the water, and the lip 56 seals on the seat 48.

In the closed condition of the valve, it will be appreciated that there is a greater area presented to the prevailing pressure in the chamber 36 by the lower end of the control float than by the upper end, and there is accordingly a differential pressure force which, together with the buoying force on the float, keeps the float in the elevated position.

Air entrained in the water in the pipeline finds its way into the valve chamber 36 during normal pressurised operation.

As the volume of air builds up in the chamber 36, the water therein is displaced downwardly. Eventually the water level drops below the flotation level of the float 38, and the mass of the float 38 overcomes the differential pressure force that acts upwardly on it and keeps it elevated. The float 38 accordingly drops down and exposes the lower end of the passage 50. An air escape passage is once again established to permit accumulated air to vent from the chamber 36.

It will be appreciated that the different passage diameters 62 and 64 give rise to a differential pressure force acting upwardly on the first kinetic float 40. As the float 38 drops down, its mass is applied to the kinetic float 40 through the connector arrangement 68. If the combined masses of the floats 38 and 40 is sufficient to overcome the differential pressure force acting upwardly on the float 40, this float also drops down.

Similarly, the kinetic float 42 will also drop down if the combined mass of the floats 38, 40 and 42 is sufficient to overcome the differential pressure force acting upwardly on the float 42, and the last kinetic float 44 will drop down if the combined mass of the floats 38, 40, 42 and 44 is sufficient to overcome the differential pressure force acting upwardly on the float 44.

In the result, the valve is fully opened and the floats are stacked one on top of the other at the bottom of the chamber 36. The full diameter of the outlet opening is available for rapid venting of air accumulated in the chamber 36.

Once the air has been evacuated, the water level rises again in the chamber 36 to buoy up the control float 38. The float 38 lifts up the kinetic floats 40, 42 and 44 and restores them to the normal operative position described above.

Sub-Atmospheric Pipeline Conditions

If the pressure in the pipeline should drop to a sub-atmospheric level for any reason, for instance rapid closing of an upstream valve, the pressure differential acting on the combination of floats will rapidly cause them to drop down to expose the outlet opening 24. Atmospheric rushes in to restore pressure equilibrium in the pipeline.

A major advantage of the embodiment of FIG. 1 as described above is the controlled kinetic valve closure which is achieved during pipeline filling. With this arrangement, the onrush of water in the pipeline is slowed down in a controlled manner, and damage which might otherwise be caused to the valve and/or pipeline when the valve closes can be avoided. It will be appreciated that, while the drawing illustrates an embodiment with three closures in the form of the kinetic floats, other embodiments may have two or more than three such components. Obviously, the greater the number of different orifice sizes available, the closer the control that can be exercised over the water column in the pipeline during filling operations.

A further advantage of the embodiment of FIG. 1 is the fact that, during normal air venting as described above, the volume of accumulated air in the chamber 36 will determine the size of the passage which is available to permit the air to escape. In other words, if there is a large volume of accumulated air, all the floats will drop to expose the full diameter outlet opening 24 for rapid air evacuation. On the other hand, if there is only a relatively small volume of accumulated air only the lowest float or floats will drop down to expose a correspondingly smaller air venting passage. Thus the size of the vent passage available for air exhaustion is automatically controlled to suit prevailing conditions in the pipeline.

FIGS. 2a to 2f illustrate a second embodiment of the invention in diagrammatic form. It can be assumed that the structure of the valve housing and other fixed components are similar to those in FIG. 1. Components corresponding to the components seen in FIG. 1 are indicated with the same reference numerals.

As in the first embodiment, there is a stack of movable valve members 40, 42 and 44 arranged in a stack above a control float 38. The movable valve members have passages through them which are of increasing diameter with increasing height in the stack.

Figure 2:
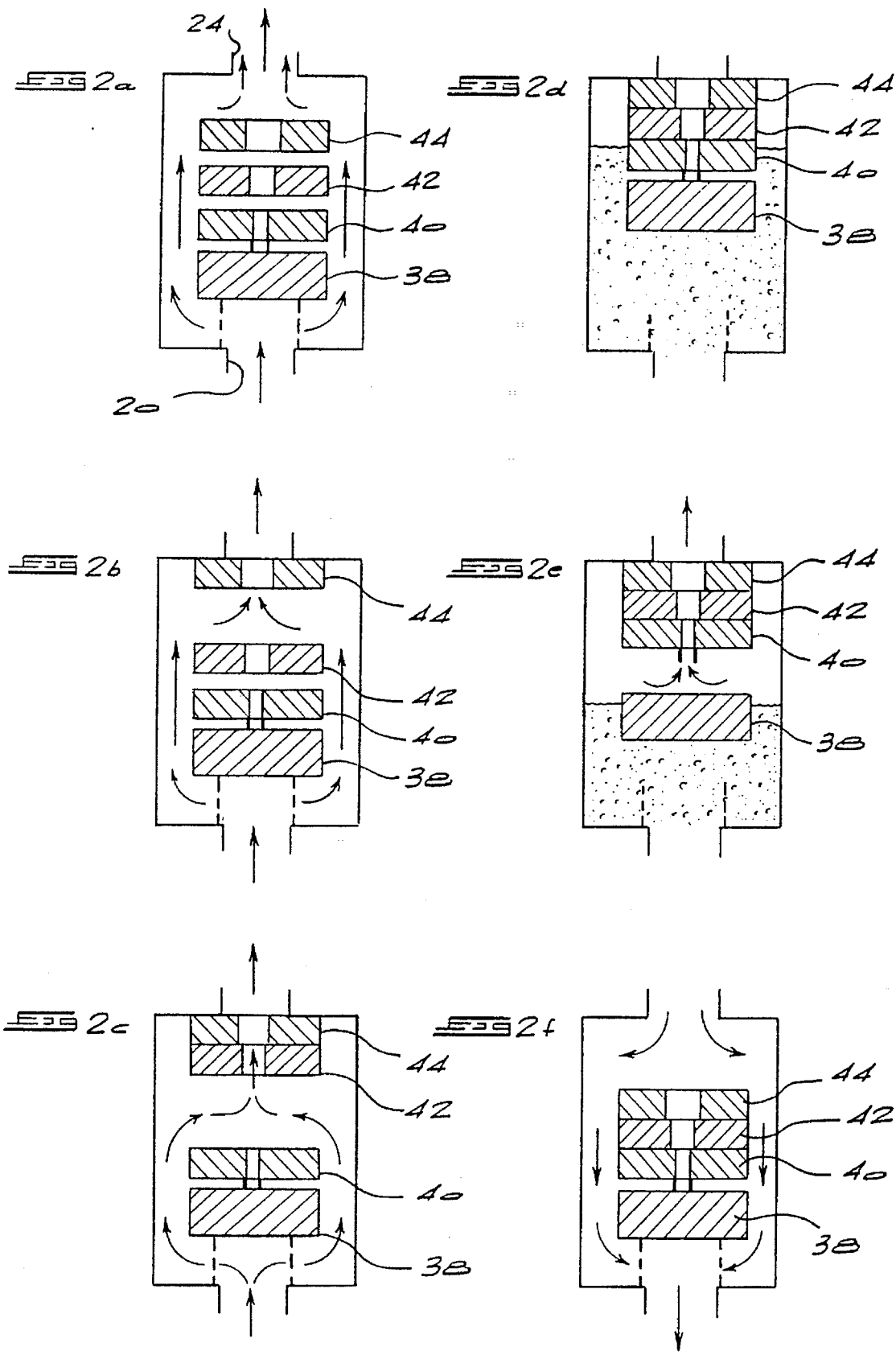
FIGS. 2a to 2f diagrammatically illustrate the operation of a second embodiment of the invention.

FIG. 2a illustrates the situation during pipeline filling. At this stage, the valve members and control float are in a dropped down position.

With a sufficiently high differential air pressure across the uppermost valve member 44, this member is lifted up dynamically to seat against the outlet 24. This is illustrated in FIG. 2b. Thereafter, the valve member 42 is lifted up dynamically at the appropriate differential air pressure across it, and seats against the underside of the valve member 44 as shown in FIG. 2c.

As described previously, the seating of the member 44 against the outlet 24 reduces the area available to flow of air through the valve, with the result that a damping effect is applied to the column of water which rushes down the pipeline to fill it. There is a further reduction in available area, and an increased damping effect, when the valve member 42 seats against the member 44.

In this embodiment, only the members 44 and 42 are designed to be raised dynamically by the air venting through the valve. The passage sizes are chosen such that the water column is damped to an extent sufficient to avoid excessive water hammer and other undesirable hydraulic shock effects.

When all the air has been displaced from the relevant section of the pipeline, water enters the valve chamber and buoys up the control float 38 and, with it, the valve member 40, as shown in FIG. 2d. The member 40 seats against the member 42 and the control float 38 seats against the passage through the member 40. As in the first embodiment, this passage has a smaller diameter than that of the member 42.

During normal pressurised operation of the pipeline, air will accumulate in the valve chamber, displacing water therefrom until such time as the water level drops below the flotation level of the control float 38. The control float therefore drops down on the surface of the water in the chamber, opening the passage through the member 40 and allowing air to vent from the chamber, as illustrated by the arrows in FIG. 2e.

The valve member 40 remains in the elevated position seen in FIG. 2e by virtue of the upward pressure differential during normal pressurised operation of the air release valve acting on it. The same is true of the valve members 42 and 44. It will thus be appreciated that during normal pressurised operation of the pipeline, the members 40, 42 and 44 remain in the elevated positions seen in FIG. 2e, with the control float moving up and down, in response to water level fluctuations in the valve chamber, and allowing accumulated air to vent each time it moves down.

If an underpressure situation develops in the pipeline, for instance as a result of an upstream valve closure, the atmospheric pressure acting on the stack of members, together with their weight, will cause them to drop down rapidly to the FIG. 2f position, allowing atmospheric air to rush into the pipeline to restore pressure equilibrium.

Apart from the fact that only the upper two members in the stack are closed dynamically during pipeline filling, as opposed to all three members as in the first embodiment, there is a further distinction in that in the second embodiment the members are not connected to one another as in the first embodiment.

It should be noted that in other embodiments of the invention, not illustrated, there may be a single member which closes dynamically to reduce the area available to air flow during pipeline filling.

Figure 3:
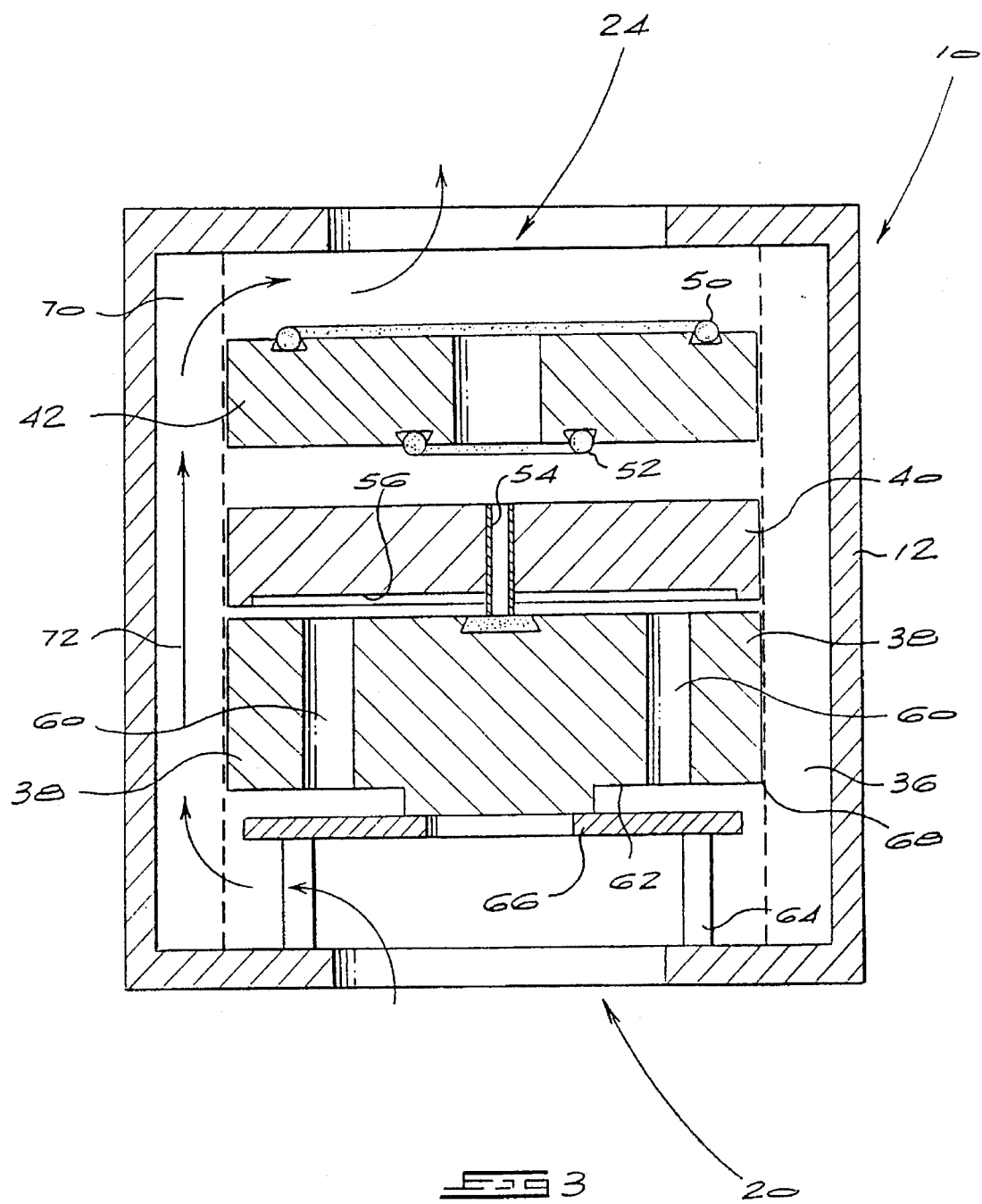
FIG. 3 diagrammatically illustrates a third embodiment of the invention.

FIG. 3 diagrammatically illustrates a third embodiment of the invention. As in the case of FIGS. 2a to 2f, the constructional details of the valve may be taken to be similar to those in FIG. 1. In this embodiment, the valve 10 has a housing 12 with an inlet opening 20 and an outlet opening 24. Inside the chamber 36 defined by the housing 12 are a control float 38, a first movable valve member 40 and a second movable valve member 42. The valve member 42 carries an O-ring seal 50 on its upper surface and a further O-ring seal 52 on its lower surface.

The axial passage through the first valve member 40 accommodates a nozzle 54 which is of smaller diameter than the passage through the second valve member 42. The underside of the first valve member 40 is formed with a shallow recess 56 and the nozzle projects downwardly from the base of the recess. The control float 38 is formed with a series of angularly spaced passages 60 extending vertically through it from the upper surface of the float to an annular recess 62 in the underside of the float.

The stops 23 of FIG. 1 are replaced in FIG. 3 by angularly spaced posts 64. An annular baffle plate 66 is supported by the upper ends of the posts 64. It will be noted that the outer diameter of the control float 38 is slightly greater than the outer diameter of the baffle plate 66, so that a corner 68 of the control float projects radially beyond the baffle plate.

Angularly spaced guides 70 extend from the bottom of the chamber 36 to the top and serve to guide the vertical movement of the control float and valve members.

During pipeline filling, air enters the inlet 20 at a substantial rate and flows outwardly between the posts 64 and then upwardly around the baffle plate and control float, as indicated by the arrows 72. The projecting corner 68 of the control float causes turbulence in the air flow and results in the creation of a reduced pressure in this area. The low pressure in the vicinity of the corner 68 applies a suction force, via the passages 60, to the valve member 40, with the result that the valve member 40 is held down onto the control float 38.

As in the previous embodiments, the pressure build-up in the chamber 36 results in a pressure differential across the uppermost valve member 42. This valve member is lifted dynamically with the result that the O-ring 50 seats against the outlet 24, thereby reducing the area available to air flow in a manner similar to the previous embodiments.

After the air has been evacuated, water enters the chamber 36 and acts on the corner 68. The water also acts through the central opening in the baffle plate 66 on the bottom of the control float. The hydraulically generated force of the water on the control float 68 lifts it up with the lower valve member 40 and causes the valve member 40 to seat against the O-ring 52. Water which now enters the chamber 36 cannot escape to atmosphere. The control float 38 is retained in the seated position by a combination of its buoyancy in the water and the pressure differential across it.

When air has accumulated in the chamber 36 to the extent that the water level drops below the buoyancy level of the control float, this float moves downwardly to expose the nozzle 54 and allow the accumulated air to excape to atmosphere. Thus in normal operation, the control float moves up and down as required to vent accumulated air from the chamber. The valve members 40 and 42 remain in their upper seated positions as long as the valve chamber 36 is pressurised and the pressure differential across each member generates sufficient lifting force to overcome the mass of the member.

If an underpressure should develop in the pipeline served by the valve 10, the control float and both valve members drop down to the illustrated position. This allows air to rush rapidly into the pipeline to achieve pressure equalisation.

The FIG. 3 embodiment has the same advantage as the previous embodiments, namely that of reducing the area available to air flow during pipeline filling. This damps the water flowing in the pipeline to some extent and reduces the chances of water hammer or other damage which might result from sudden and complete valve closure. As in the earlier embodiments, there may be more than one valve member which closes dynamically as air flows out of the valve chamber, the various valve members having reducing air flow areas to provide a sequential damping effect.

In the FIG. 3 embodiment that the O-ring 50 on the movable valve member 42 could be replaced by an O-ring mounted on the housing, around the outlet opening 24, against which the member 42 can seal.

We claim:

1. An air release valve comprising:

a valve chamber having an inlet and an outlet, a control float positioned adjacent the inlet in the chamber, said control float being movable, in use, in response to changes in liquid level in the chamber, and a stack of movable valve members positioned in the chamber above the control float, the movable valve members having vent passages therethrough which increase in size with increasing height in the stack but which are smaller than the outlet, and the top movable valve member in the stack being lifted up, by differential in air pressure acting on the top movable valve member, to seat the top movable valve member on the outlet and thereby reduce the effective size of the outlet when a pipeline served by the air release valve is filling with liquid and the liquid displaces air through the valve.

2. An air release valve according to claim 1 wherein the stack of movable valve members includes at least two valve members which are adapted to be lifted in sequence by differential air pressures during pipeline filling, thereby to reduce the effective size of the outlet in increments as the top movable valve member is seated on the outlet and the remaining valve members are lifted in sequence and sealably engaged to the adjacent movable valve member in the stack.

3. An air release valve according to claim 1 wherein the stack of movable valve members includes a valve member which is adapted to be lifted up, to seat against the valve member immediately above it, by the control float when the control float is buoyed up in the valve chamber by liquid which enters the valve chamber when air has been evacuated from the pipeline during pipeline filling.

4. An air release valve according to claim 3 wherein the upper end of the vent passage of each movable valve member is surrounded by an annular valve seat adapted to seal against the valve member immediately above it.

5. An air release valve according to claim 4 comprising a round cylindrical housing defining the valve chamber, the vent passages of the valve members being located on the axis of the housing.

6. An air release valve according to claim 5 wherein the control float has a valve seat on the axis of the housing and against which the bottom valve member in the stack can seat.

7. An air release valve according to claim 1, wherein the vent passages through the stack of movable valves are in general vertical alignment.

\* \* \* \* \*